United States Patent [19]

Rutschmann et al.

[11] Patent Number: 4,895,112
[45] Date of Patent: Jan. 23, 1990

[54] INTAKE PIPE SYSTEM FOR A RECIPROCATING ENGINE

[75] Inventors: Erwin Rutschmann, Tiefenbronn; Klaus Schneider, Tiefenbronn-Muehlhausen, both of Fed. Rep. of Germany

[73] Assignee: Dr. Ing. h.c.F. Porsche AG, Weissach, Fed. Rep. of Germany

[21] Appl. No.: 151,191

[22] Filed: Feb. 1, 1988

[30] Foreign Application Priority Data

Jan. 31, 1987 [DE] Fed. Rep. of Germany ....... 3702902

[51] Int. Cl.⁴ .............................................. F02M 35/10
[52] U.S. Cl. ......................... 123/52 MV; 123/52 MC
[58] Field of Search ........ 123/52 M, 52 MV, 52 ML, 123/432, 52 MC

[56] References Cited

U.S. PATENT DOCUMENTS

| 2,916,027 | 12/1959 | Chayne et al. | |
| 3,780,719 | 12/1973 | Weiertz | 123/52 ML |
| 4,418,676 | 12/1983 | Iwao | 123/52 MV |
| 4,577,596 | 3/1986 | Senga | 123/52 MV |
| 4,782,797 | 11/1988 | Kurahashi | 123/52 MV |

FOREIGN PATENT DOCUMENTS

| 1231060 | 12/1966 | Fed. Rep. of Germany . | |
| 2930697 | 2/1981 | Fed. Rep. of Germany . | |
| 0093845 | 11/1983 | Fed. Rep. of Germany . | |
| 0158008 | 1/1985 | Fed. Rep. of Germany . | |
| 0167794 | 6/1985 | Fed. Rep. of Germany . | |
| 1324935 | 3/1963 | France | 123/52 M |
| 0052522 | 5/1981 | Japan | 123/52 M |
| 0119360 | 8/1985 | Japan | 123/52 M |
| 230508A | 11/1985 | Japan . | |
| 532985 | 9/1939 | United Kingdom . | |
| 2135388 | 8/1984 | United Kingdom . | |

Primary Examiner—David A. Okonsky

[57] ABSTRACT

An intake pipe system for an opposed-piston or V-engine consists of a U-shaped collector intake pipe at whose two U-legs individual intake pipes are mounted to the two banks of cylinders. In the center between the U-legs, an intake stub is mounted that points in the same direction. In order to achieve an optimal charging effect, the total length of the collector intake pipe amounts to twice the total length of the individual intake pipe that is designed as a curve with respect to space.

10 Claims, 3 Drawing Sheets

INTAKE PIPE SYSTEM FOR A RECIPROCATING ENGINE

BACKGROUND AND SUMMARY OF THE INVENTION

The invention relates to an intake pipe system for a multi-cylinder reciprocating engine having a collector intake pipe and individual intake pipes originating from the collector intake pipe and leading to cylinders that are arranged in two banks.

An air intake system for a reciprocating engine that is known from DE-OS 34 08 898 and whose cylinders are arranged in two banks consists of an I-shaped distributor piece that is composed of two approximately equally large resonant containers and a connecting pipe. By means of a targeted coordination of the volume and of the free cross-sections of the air intake system, a pulsating charging of the reciprocating engine is achieved and thus an increase of the engine torque. However, the large overall length of the connecting pipe that is required for the coordination is unsatisfactory and makes the use of this air intake system more difficult in the case of V-engines having a small V-angle.

It is an object of the invention to develop and dimension an intake pipe system to be installed between two cylinder banks of a reciprocating engine so that, on the one hand, it permits a pulsating charging of the engine and, on the other hand, it has a small overall length.

This object is achieved by forming the collector intake pipe in a U-shape with individual intake pipes originating from the U-legs and with an intake stub mounted approximately at the center between the U-legs and extending perpendicularly to the web connecting the U-legs.

In especially preferred embodiments, the intake pipe system is designed as a collector intake pipe that has a U-shaped and approximately constant cross-section, the same pressures and speeds exist at all points from a stationary point of view. For achieving a gas-dynamic charge effect, only the volume of the collector intake pipe and its length must be coordinated with the length of the individual intake pipes that originate from the two U-legs and lead to the two cylinder banks. The U-legs are to be considered as a replacement of the previously known resonant containers. In their cross-section, they are as large as the web that connects them. For the pulsating charging, the air current pulsates between the two U-legs, on the one hand, as well as between the U-legs and the intake valves of the pertaining cylinder bank. An optimal charge effect is achieved when the total length of the collector intake pipe is approximately twice as large as the total length of an individual intake pipe. The individual intake pipes, begin curved with respect to space, are designed in such a way that they all have a flow resistance of approximately the same size.

Other objects, advantages and novel features of the present invention will become apparent from the following detailed description of the invention when considered in conjunction with the accompanying drawings.

DETAILED DESCRIPTION OF THE DRAWINGS

Figure 1:
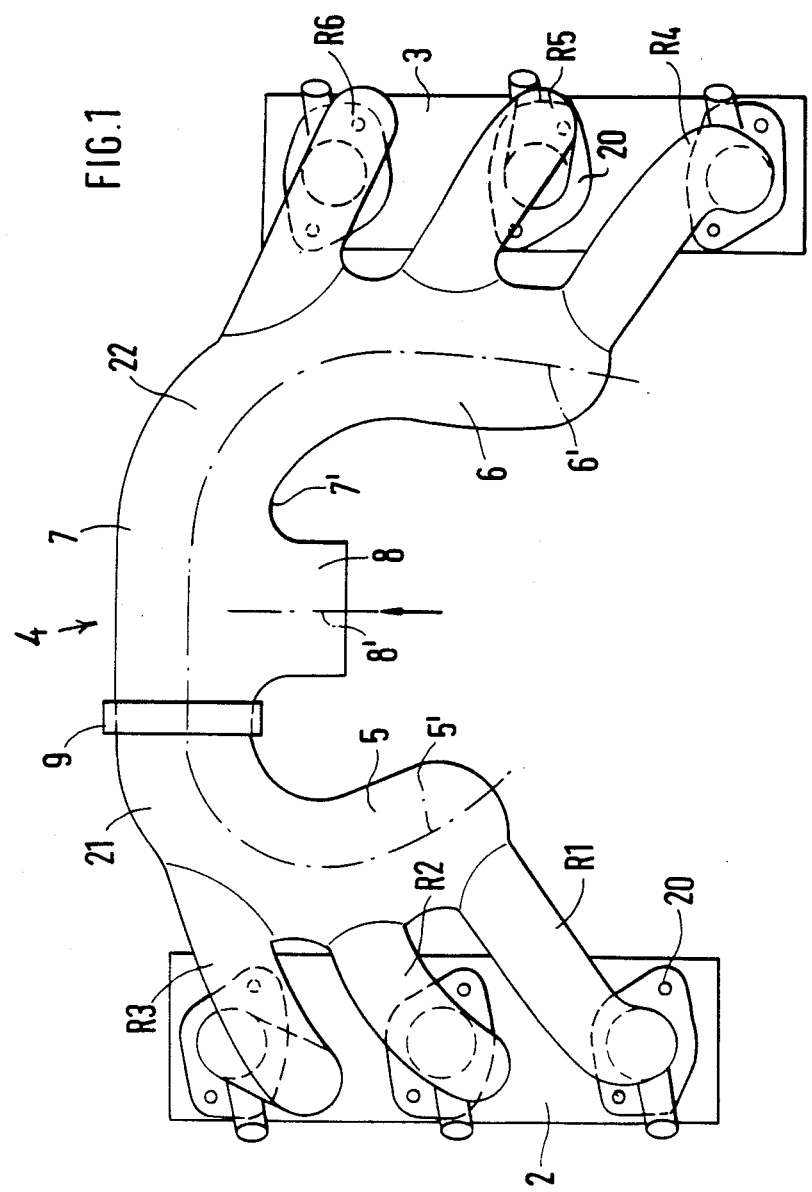
FIG. 1 is a top schematic view of an intake pipe system constructed in accordance with a preferred embodiment of the invention.
Figure 2:
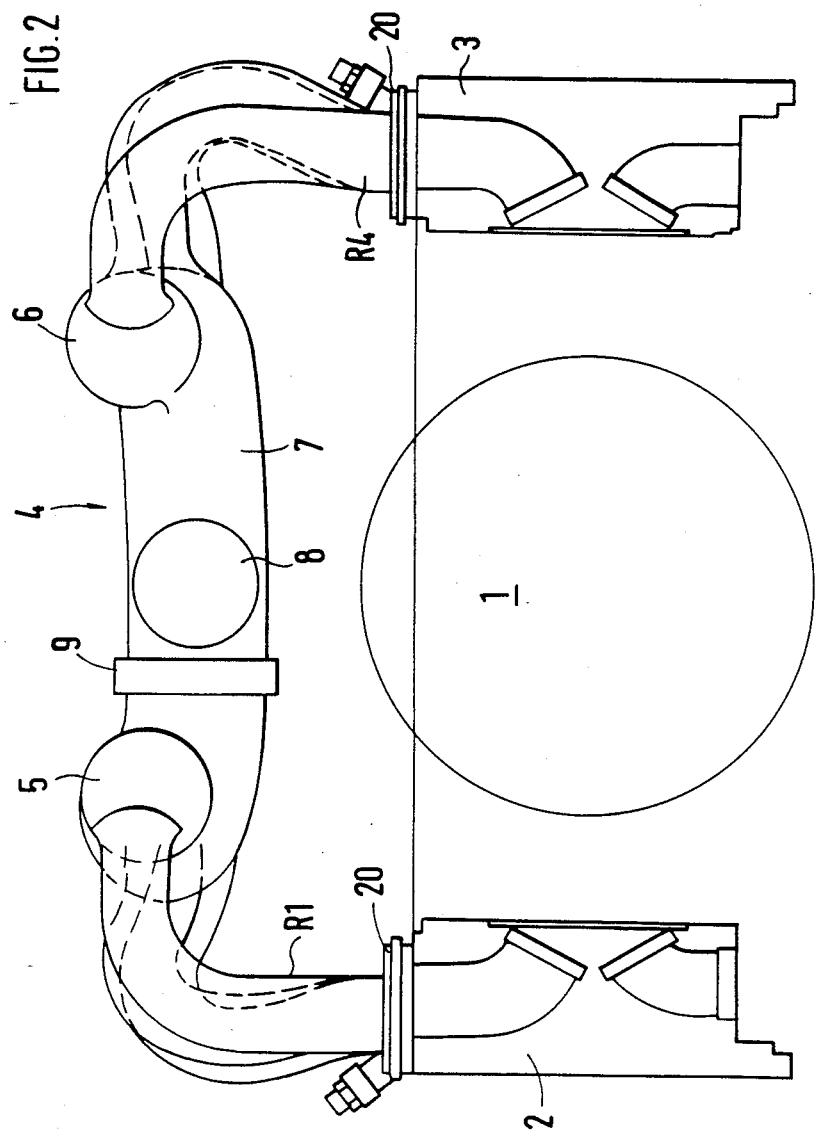
FIG. 2 is a lateral view of the intake pipe system of FIG. 1.
Figure 3:
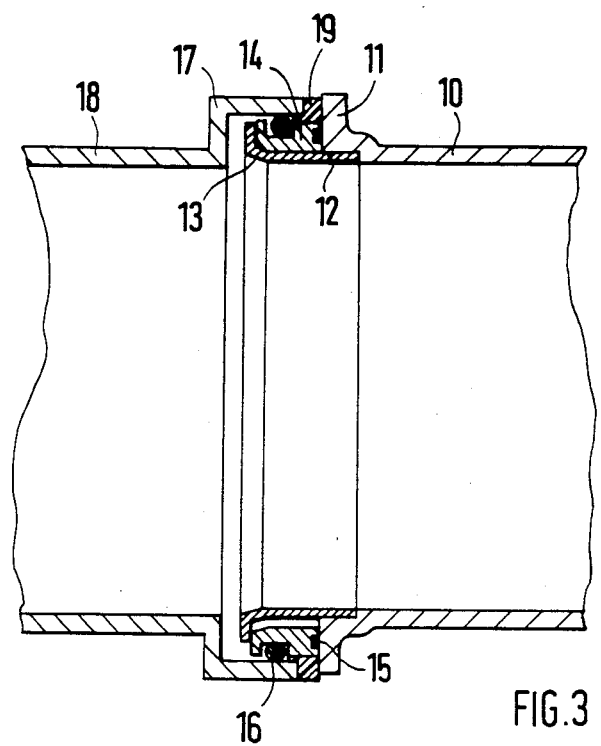
FIG. 3 is a longitudinal sectional view at the separating point of a U-leg of the intake pipe system of FIGS. 1 and 2.

An intake pipe system for distributing intake air that is welded from light-metal pipes is arranged above an opposed-piston engine 1, in the center between its left bank 2 of cylinders and its right bank 3 of cylinders. The intake pipe system consists of a collector intake pipe 4 that is U-shaped in top view and has a left U-leg 5, a right U-leg 6 and a web 7 connecting them. Approximately in the center between the two legs 5 and 6, an intake stub 8 is welded onto the web 7 and extend perpendicularly therefrom. Intake air enters into the collector intake pipe 4 via this intake stub 8.

The individual intake pipes R1, R2, R3 are welded onto the exterior side of the left U-leg 5 at an obtuse angle with respect to the pipe axes 5' of the U-leg 5. In a similar manner, the individual intake pipes R4, R5, R6 are welded onto the exterior side of the right U-leg 6. All intake pipes R1, R2, R3, R4, R5, R6 are developed to be curved with respect to space with an approximately identical total length and, with their connecting flanges 20, are screwed to the cylinder heads of the respective cylinder banks 2 and 3.

The free cross-section of the collector intake pipe 4 is approximately equally large at all points and is approximately equal to 1.2 times the sum of the cross-sections of the individual intake pipes that are connected to a respective U-leg.

In order to be able to balance manufacturing tolerances of the engine and temperature-caused changes of length of the intake pipe system, a sealed-off separating point 9 is provided between the web 7 and the left U-leg 5. With respect to U-leg 5, one leg part 10 closes off with an end flange 11. A bush 12 is pressed into this end flange 11, a sealing ring 14 being held between the collar 13 of this bush 12 and the end flange 11. On the front face, the sealing ring carries a seal 15 and at the circumference, has an O-ring 16 in a ring groove that has a sealing effect with respect to a pipe expansion 17 of the other leg part 18. Between the front face of the pipe expansion 17 and the end flange 11, a dust seal 19 made of foam rubber is inserted.

The left U-leg 5 merges into the web 7 by means of a transition curve 21 and the right U-leg 6 merges into the web 7 by means of a transition curve 22. The individual intake pipes R1 to R6 extend in parallel to one another and tangentially with respect to the transition curves 21 and 22 at their connecting points with the web 7.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. An intake pipe system for a multi-cylinder reciprocating engine, having a collector intake pipe and individual intake pipes originating from the collector intake pipe and leading to cylinders that are arranged in two banks, wherein the collector intake pipe is U-shaped, wherein the individual intake pipes originate from U-legs of the collector intake pipe, and wherein an intake stub is mounted approximately at the center between the U-legs, said intake stub extending perpendicularly to a web connecting the U-legs, wherein the individual intake pipes are mounted at exterior sides of the U-legs and at an obtuse angle with respect to central axes of the intake pipes.

2. An intake pipe system according to claim 1, wherein the individual intake pipes are curved downward in a single curve from the U-legs to end in connecting flanges that are approximately horizontal with respect to the engine.

3. An intake pipe system according to claim 1, wherein a total length of the collector intake pipe is approximately twice as large as a total length of an individual intake pipe.

4. An intake pipe system for a multi-cylinder reciprocating engine, having a collector intake pipe and individual intake pipes originating from the collector intake pipe and leading to cylinders that are arranged in two banks, wherein the collector intake pipe is U-shaped, wherein the individual intake pipes originate from U-legs of the collector intake pipe, and wherein an intake stub is mounted approximately at the center between the U-legs, said intake stub extending perpendicular to a web connecting the U-legs, wherein the individual intake pipes are disposed in parallel to one another and tangentially to a transition curve of the collection pipe connecting the straight web with the U-legs.

5. An intake pipe system according to claim 4, wherein a total length of the collector intake pipe is approximately twice as large as a total length of an individual intake pipe.

6. An intake pipe system for a multi-cylinder reciprocating engine, having a collector intake pipe and individual intake pipes originating from the collector intake pipe and leading to cylinders that are arranged in two banks, wherein the collector intake pipe is U-shaped, wherein the individual intake pipes originate from U-legs of the collector intake pipe, and wherein an intake stub is mounted approximately at the center between the U-legs, said intake stub extending perpendicularly to a web connecting the U-legs, wherein the free flow cross-sectional area of the collector intake pipe amounts to 1.2 to 1.3 times the sum of all free flow cross-sectional areas of the individual intake pipes that are connected to a respective U-leg.

7. An intake pipe system according to claim 6, wherein a total length of the collector intake pipe is approximately twice as large as a total length of an individual intake pipe.

8. An intake pipe system for a multi-cylinder reciprocating engine, having a collector intake pipe and individual intake pipes originating from the collector intake pipe and leading to cylinders that are arranged in two banks, wherein the collector intake pipe is U-shaped, wherein the individual intake pipes originate from U-legs of the collector intake pipe, and wherein an intake stub is mounted approximately at the center between the U-legs, said intake stub extending perpendicularly to a web connecting the U-legs, wherein a total flow path defined as a distance between the intake stub and a connecting flange of an individual intake pipe that connects the individual intake pipe to a respective cylinder, is approximately the same for distances between the intake stub and all connecting flanges of the individual intake pipes of both banks of cylinders.

9. An intake pipe system according to claim 8, wherein a total length of the collector intake pipe is approximately twice as large as a total length of an individual intake pipe.

10. An intake pipe system for a multi-cylinder reciprocating engine, having a collector intake pipe and individual intake pipes originating from the collector intake pipe and leading to cylinders that are arranged in two banks, wherein the collector intake pipe is U-shaped, wherein the individual intake pipes originate from U-legs of the collector intake pipe, and wherein an intake stub is mounted approximately at the center between the U-legs, said intake stub extending perpendicularly to a web connecting the U-legs, at least one U-leg of the collector intake pipe has a sealed-off separating point for compensating at least one of a change of length and a transverse offsetting, wherein the separating point is formed of a bush that is pressed into an end flange of one leg part, of a sealing ring that rests against a collar of the bush and against the end flange, said sealing ring being disposed on the bush with significant radial play and in an outer groove containing an O-ring for sealing-off, with respect to a pipe expansion fitted above it, the other leg part as well as of a dust seal that is inserted between the front face and the end flange of one leg part.

* * * * *